(12) United States Patent
Lin

(10) Patent No.: US 8,937,470 B2
(45) Date of Patent: Jan. 20, 2015

(54) ACTIVE POWER FACTOR CORRECTION CIRCUIT AND RELATED PFC CONTROLLER

(71) Applicant: Richtek Technology Corporation, Hsinchu County (TW)

(72) Inventor: Tzu-Chen Lin, Changhua County (TW)

(73) Assignee: Richtek Technology Corporation, Zhubei (TW)

( * ) Notice: Subject to any disclaimer, the term of this patent is extended or adjusted under 35 U.S.C. 154(b) by 217 days.

(21) Appl. No.: 13/661,892

(22) Filed: Oct. 26, 2012

(65) Prior Publication Data

US 2013/0121047 A1     May 16, 2013

(30) Foreign Application Priority Data

Nov. 11, 2011   (TW) .............................. 100141361 A

(51) Int. Cl.
　　*G05F 1/00*　　　(2006.01)
　　*H02M 1/42*　　　(2007.01)
　　*H02M 1/00*　　　(2006.01)

(52) U.S. Cl.
　　CPC .... *H02M 1/4225* (2013.01); *H02M 2001/0022* (2013.01); *H02M 2001/0025* (2013.01); *Y02B 70/126* (2013.01)
　　USPC .............................. 323/284; 323/285; 363/89

(58) Field of Classification Search
　　USPC ............... 323/207, 222, 284, 285; 363/84, 89
　　See application file for complete search history.

(56) References Cited

U.S. PATENT DOCUMENTS

| | | | |
|---|---|---|---|
| 6,812,769 B1 | 11/2004 | Yang et al. | |
| 7,317,625 B2* | 1/2008 | Zhang et al. | 363/89 |
| 7,723,967 B2* | 5/2010 | Bernardon | 323/266 |
| 7,821,237 B2* | 10/2010 | Melanson | 323/222 |
| 7,903,439 B2* | 3/2011 | Oettinger et al. | 363/89 |
| 8,040,122 B2* | 10/2011 | Chang et al. | 323/288 |
| 8,085,563 B2* | 12/2011 | Gaboury et al. | 363/89 |
| 8,169,206 B2* | 5/2012 | Chang et al. | 323/284 |
| 2006/0103364 A1 | 5/2006 | Adragna et al. | |
| 2008/0084198 A1 | 4/2008 | Baurle et al. | |
| 2008/0315852 A1* | 12/2008 | Jayaraman et al. | 323/285 |
| 2008/0316779 A1* | 12/2008 | Jayaraman et al. | 363/74 |
| 2009/0175058 A1* | 7/2009 | Baurle et al. | 363/21.16 |

FOREIGN PATENT DOCUMENTS

| | | |
|---|---|---|
| CN | 1953307 A | 4/2007 |
| TW | 201115892 A | 5/2011 |

* cited by examiner

*Primary Examiner* — Gary L. Laxton
*Assistant Examiner* — Lakaisha Jackson
(74) *Attorney, Agent, or Firm* — Birch, Stewart, Kolasch & Birch, LLP

(57) ABSTRACT

An active power factor correction (PFC) circuit for calibrating a power factor of an AC-to-DC converter when the active PFC circuit is coupled with the AC-to-DC converter is disclosed including: a piecewise linear gain circuit, an error amplifier, a PWM controller, and a PWM signal generator. The piecewise linear gain circuit is for receiving a feed forward signal and generating a corresponding gain signal, wherein the gain signal and the feed forward signal have a broken line relation with respect to magnitude. The error amplifier is for generating an error signal according to an output voltage of the AC-to-DC converter. The PWM controller is for generating a control signal according to the gain signal and the error signal. The PWM signal generator is for generating a PWM signal for controlling a power switch of the AC-to-DC converter according to the control signal.

15 Claims, 2 Drawing Sheets

ACTIVE POWER FACTOR CORRECTION CIRCUIT AND RELATED PFC CONTROLLER

CROSS-REFERENCE TO RELATED APPLICATIONS

This application claims the benefit of priority to Patent Application No. 100141361, filed in Taiwan on Nov. 11, 2011; the entirety of which is incorporated herein by reference for all purposes.

BACKGROUND

The present disclosure generally relates to a power factor correction circuit and, more particularly, to a control circuit for an active power factor correction circuit.

The power utilization efficiency of electronic devices has become more and more important as the energy shortage problem deteriorates. The traditional AC-to-DC converter is typically realized by using diode rectifiers. Although such structure is simple and low cost, serious non-linear distortion occurs at an input current to greatly increase the low frequency harmonics, thereby decreasing the power factor. The power factor is defined as a ratio of the working power to the apparent power, and is an indicator for measuring the power utilization efficiency. Electronic devices with low power factor not only waste energy, but also generate enormous harmonics to adversely affect the stability to the power system and cause problems to the power generator, thereby seriously affecting the quality of power supply.

A power factor correction (PFC) circuit is employed in many AC-to-DC converters to improve the power factor. In order to avoid a feedback compensation signal from changing with the magnitude of an input voltage, the PFC circuit usually adopts a circuit structure using an input voltage feedforward control mechanism. Such circuit structure requires a squarer to compute a square value of the input voltage and to generate required control signals by cooperating with a multiplier and a divider.

However, the squarer is not only complex in design, but also occupies considerable circuit area and requires high manufacturing cost and power consumption. Accordingly, the use of the squarer obstructs the PFC circuit to improve the power utilization efficiency and to further reduce the circuit size.

SUMMARY

An example embodiment of an active power factor correction (PFC) circuit for calibrating a power factor of an AC-to-DC converter comprising an inductor and a power switch when the active PFC circuit is coupled with the AC-to-DC converter is disclosed. The active PFC circuit comprises: a piecewise linear gain circuit for receiving a feed forward signal and generating a corresponding gain signal, wherein the gain signal and the feed forward signal have a broken line relation with respect to magnitude; an error amplifier for generating an error signal according to an output voltage of the AC-to-DC converter; a PWM controller for generating a control signal according to the gain signal and the error signal; and a PWM signal generator, coupled with the PWM controller, for generating a PWM signal for controlling the power switch of the AC-to-DC converter according to the control signal.

An example embodiment of a PFC controller for controlling a PWM signal generator of an active PFC (power factor correction) circuit when the PFC circuit is coupled with an AC-to-DC converter is disclosed. The PFC controller comprises: a piecewise linear gain circuit for receiving a feed forward signal, wherein if the feed forward signal is less than a predetermined threshold, the piecewise linear gain circuit applies a first gain to the feed forward signal to generate a gain signal, and if the feed forward signal is greater than the predetermined threshold, the piecewise linear gain circuit applies a second gain to the feed forward signal to generate the gain signal; an error amplifier for generating an error signal according to an output voltage of the AC-to-DC converter; and a PWM controller for generating a control signal according to the gain signal and the error signal to control the PWM signal generator; wherein the second gain is greater than the first gain.

The afore-mentioned active power factor correction circuit and the PFC controller utilize the piecewise linear gain circuit for replacing a traditional squarer to reduce the complexity of circuit structure and required bias sources, and thus the overall circuit area can be greatly reduced and the required power consumption and manufacturing cost can also be lowered.

Since the magnitude of the gain signal generated by the aforementioned piecewise linear gain circuit approximates to a square value of the feed forward signal, the PWM controller may divide the error signal by the gain signal to avoid the feedback compensation signal from changing with the input voltage.

It is to be understood that both the foregoing general description and the following detailed description are example and explanatory only and are not restrictive of the invention, as claimed.

DETAILED DESCRIPTION

Reference is made in detail to embodiments of the invention, which are illustrated in the accompanying drawings.

The same reference numbers may be used throughout the drawings to refer to the same or like parts, components, or operations. Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to . . . " Also, the phrase "coupled with" is intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a", "an", and "the" herein are intended to comprise the plural forms as well, unless the context clearly indicates otherwise.

Figure 1:
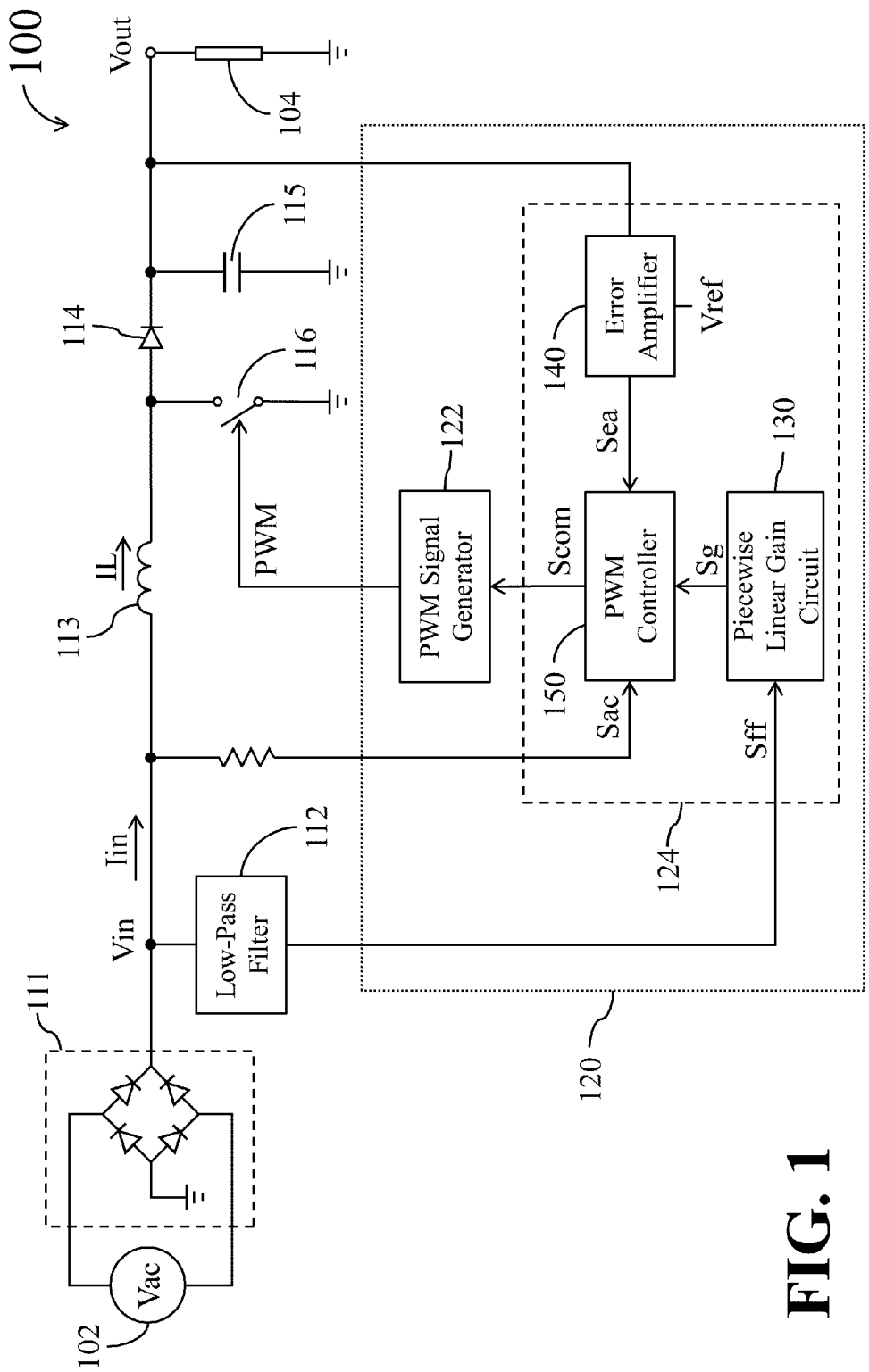
FIG. 1 is a simplified functional block diagram of an AC-to-DC converter in accordance with an example embodiment.

Please refer to FIG. 1, which shows a simplified functional block diagram of an AC-to-DC converter 100 in accordance with an example embodiment. The AC-to-DC converter 100 is utilized for converting an AC voltage Vac provided by an AC power source 102 into a DC output voltage Vout, and provides the output voltage Vout to a load 104. In this embodiment, the AC-to-DC converter 100 comprises a bridge rectifier 111, a low-pass filter 112, an inductor 113, a diode 114, an output capacitor 115, a power switch 116, and an active power factor correction (PFC) circuit 120.

The bridge rectifier 111 is utilized for rectifying the AC voltage Vac provided by the AC power source 102 to an input voltage Vin having m-shaped waves. The low-pass filter 112 is coupled with an output terminal of the bridge rectifier 111 to filter the input voltage Vin to generate a feed forward signal Sff directly proportional to a mean value of the input voltage Vin. The inductor 113 and the diode 114 are coupled between an output terminal of the bridge rectifier 111 and the load 104. The output capacitor 115 is coupled with the diode 114. One terminal of the power switch 116 is coupled between the inductor 113 and the diode 114, and the power switch 116 switches under the control of the active PFC circuit 120. In implementations, the power switch 116 may be realized by a transistor.

When the power switch 116 is turned on, the diode 114 of the AC-to-DC converter 100 is reverse biased and stays in the off state, so that an input current Iin flows to the power switch 116 through the inductor 113. In this situation, the input voltage Vin charges the inductor 113 and thus causes an inductor current IL to linearly rise gradually until the power switch 116 is turned off. At this time, the energy required by the load 104 is supplied by the output capacitor 115.

When the power switch 116 is turned off, the polarity of the voltage across the inductor 113 reverses, so that the inductor 113 and the input voltage Vin both charge the output capacitor 115 through the diode 114. In this situation, the output capacitor 115 is in a charging state, and the inductor current IL would gradually decline until the power switch 116 is turned on next time. At this stage, the output voltage Vout remains stable, and the magnitude of the output voltage Vout is the sum of the input voltage Vin and the voltage across the inductor 113.

As shown in FIG. 1, the active PFC circuit 120 comprises a PWM signal generator 122 and a PFC controller 124. The PFC controller 124 comprises a piecewise linear gain circuit 130, an error amplifier 140, and a PWM controller 150. When the active PFC circuit 120 is coupled with the AC-to-DC converter 100, the piecewise linear gain circuit 130 is utilized for receiving a feed forward signal Sff outputted from the low-pass filter 112 and for generating a gain signal Sg having a magnitude approximates to a square value of the magnitude of the feed forward signal Sff. The error amplifier 140 is utilized for generating an error signal Sea according to an output voltage Vout of the AC-to-DC converter 100. For example, the error amplifier 140 may compare a reference voltage Vref with a feedback voltage having a proportional relation with the output signal Vout and amplify the resulting difference to generate the error signal Sea. The PWM controller 150 is coupled with the piecewise linear gain circuit 130 and the error amplifier 140 to generate a control signal Scom according to the gain signal Sg, the error signal Sea, and the input voltage Vin, and makes the control signal Scom to be directly proportional to a magnitude of the error signal Sea and a magnitude of the input voltage Vin, and inversely proportional to a magnitude of the gain signal Sg. In implementations, the PWM controller 150 may be a multiplier-divider for dividing the error signal Sea outputted from the error amplifier 140 by the gain signal Sg outputted from the piecewise linear gain circuit 130 and then multiplying a resulting value by a magnitude of the rectified input voltage Vin to generate the control signal Scom. Alternatively, the functionalities of the PWM controller 150 may be realized by other circuit structures. The PWM signal generator 122 generates a pulse width modulated signal PWM according to the control signal Scom to control the switching operations of the power switch 116.

In this embodiment, when the feed forward signal Sff is less than a predetermined threshold Vth, the piecewise linear gain circuit 130 applies a first gain to the feed forward signal Sff to generate the gain signal Sg, and when the feed forward signal Sff is greater than or equal to the predetermined threshold Vth, the piecewise linear gain circuit 130 applies a second gain to the feed forward signal Sff to generate the gain signal Sg, wherein the second gain is greater than the first gain. As a result, the gain signal Sg and the feed forward signal Sff have a broken line relation (i.e., a piecewise linear correlation) with respect to magnitude. The implementations and operations of the piecewise linear gain circuit 130 will be further described below with reference to FIG. 2.

Figure 2:
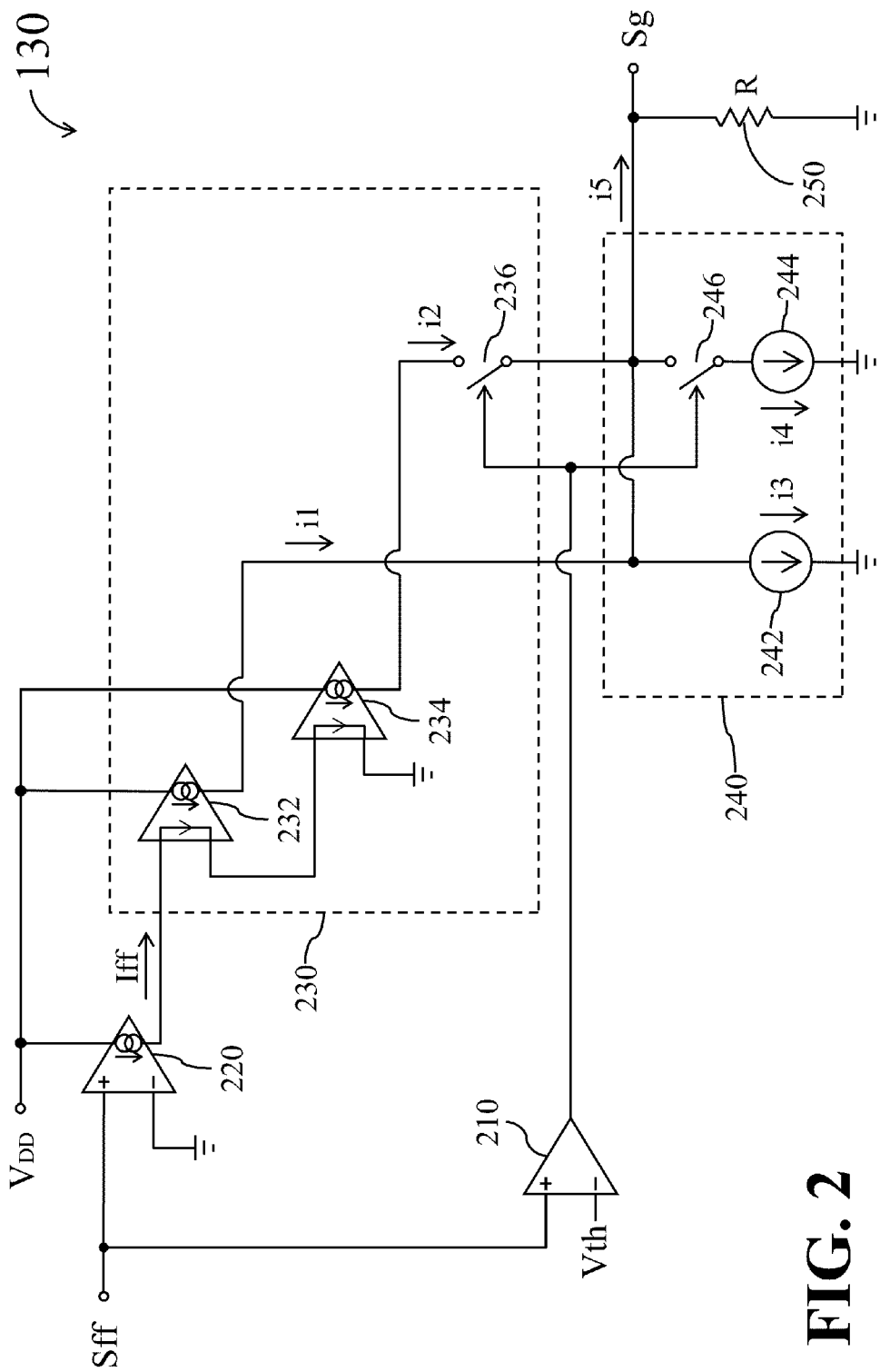
FIG. 2 is a simplified functional block diagram of a piecewise linear gain circuit of FIG. 1 in accordance with an example embodiment.

FIG. 2 is a simplified functional block diagram of the piecewise linear gain circuit 130 in accordance with an example embodiment. As shown in FIG. 2, the piecewise linear gain circuit 130 comprises a comparing circuit 210, a transconductance circuit 220, an amplifying module 230, a current adjusting module 240, and a resistor 250. The transconductance circuit 220 is utilized for converting the feed forward signal Sff into a current signal to generate a feed forward current Iff directly proportional to a voltage of the feed forward signal Sff. The amplifying module 230 is coupled with an output terminal of the transconductance circuit 220 to amplify the current Iff to generate a current directly proportional to the voltage of the feed forward signal Sff. The current adjusting module 240 is coupled with an output terminal of the amplifying module 230 and the comparing circuit 210 to sink current. In operations, the comparing circuit 210 compares the feed forward signal Sff with the threshold Vth and adjusts a total current output of the amplifying module 230 and a total current sink of the current adjusting module 240 according to comparison results.

In the embodiment of FIG. 2, the amplifying module 230 comprises an amplifier 232, an amplifier 234, and a switch 236. The current adjusting module 240 comprises a current sink 242, a current sink 244, and a switch 246. The amplifier 232 is utilized for amplifying the current Iff to generate a current i1 directly proportional to the voltage of the feed forward signal Sff. The amplifier 234 is utilized for amplifying the current Iff to generate a current i2 directly proportional to the voltage of the feed forward signal Sff. The current sink 242 is coupled with an output terminal of the amplifier 232 to sink a first predetermined amount of current i3. The current sink 244 is utilized for sinking a second predetermined amount of current i4. The switch 236 is coupled between an output terminal of the amplifier 234 and the current sink 242 to couple the current i2 to an input terminal of the current sink 242 when the switch 236 is turned on. The switch 246 is coupled between an output terminal of the amplifier 232 and the current sink 244 to couple the current i1 to an input terminal of the current sink 244 when the switch 246 is turned on.

In this embodiment, when the feed forward signal Sff is less than the predetermined threshold Vth, the comparing circuit 210 turns off both the switch 236 and the switch 246 so that a total current output of the amplifying module 230 is i1, and a total current sink of the amplifying module 240 is i3.

When the feed forward signal Sff is greater than or equal to the predetermined threshold Vth, the comparing circuit 210 turns on both the switch 236 and the switch 246 so that the total current output of the amplifying module 230 becomes the sum of i1 and i2, and the total current sink of the amplifying module 240 becomes the sum of i3 and i4.

As a result, when the feed forward signal Sff is less than the predetermined threshold Vth, the output current i5 of the piecewise linear gain circuit 130 is i1−i3. At this time, the gain signal Sg outputted from the piecewise linear gain circuit 130 may be represented by the following equation:

$$Sg=(G1*Vin-i3)*R \qquad \text{equation (1)}$$

where G1 is a gain of the amplifier 232 and R is a resistance value of the resistor 250. As can be seen from the equation (1), when the feed forward signal Sff is less than the predetermined threshold Vth, the gain signal Sg and the feed forward signal Sff have a positive linear correlation with respect to magnitude.

When the feed forward signal Sff is greater than or equal to the predetermined threshold Vth, the output current i5 of the piecewise linear gain circuit 130 is i1+i2−i3−i4. At this time, the gain signal Sg outputted from the piecewise linear gain circuit 130 may be represented by the following equation:

$$Sg=[(G1+G2)*Vin-(i3+i4)]*R \qquad \text{equation (2)}$$

where G2 is a gain of the amplifier 234. As can be seen from the equation (2), when the feed forward signal Sff is greater than or equal to the predetermined threshold Vth, the gain signal Sg and the feed forward signal Sff have a positive linear correlation with respect to magnitude, but the gain of the gain signal Sg is greater than that when the feed forward signal Sff is less than the threshold Vth.

As can be seen from the equation (1) and equation (2), the gain signal Sg and the feed forward signal Sff have a broken line relation with respect to magnitude. That is, the gain signal Sg and the feed forward signal Sff have a piecewise linear correlation with respect to magnitude. By properly selecting the element parameters for the piecewise linear gain circuit 130, the piecewise linear gain circuit 130 may be utilized for generating a calculation result approximating to that of a squarer.

For example, if the voltage of the feed forward signal Sff ranges from 0.8~2.5V, in an embodiment, the gain G1 of the amplifier 232 and the gain G2 of the amplifier 234 may be set to be 1.1, the predetermined threshold Vth may be set to be 1.65V, the amount of current sink i3 of the current sink 242 may be set to be 0.6*Iff, the amount of current sink i4 of the current sink 244 may be set to be 1.8*Iff. Under such configuration, the magnitude of the gain signal Sg approximates to a square value of the magnitude of the feed forward signal Sff. If the voltage range of the feed forward signal Sff is different from the afore-mentioned example, the piecewise linear gain circuit 130 may generate approximate calculation results as the squarer by properly adjusting the element parameters of the piecewise linear gain circuit 130.

Accordingly, the afore-mentioned piecewise linear gain circuit 130 may be utilized to replace the traditional squarer. The circuit structure of the piecewise linear gain circuit 130 is much simpler than that of the traditional squarer and requires much less bias voltage sources than the traditional squarer. Accordingly, the circuit area of the PFC controller 124 can be effectively reduced and the power consumption and manufacturing cost of the active PFC circuit 120 can be lowered.

As in the foregoing descriptions, the PWM controller 150 of the PFC controller 124 may divide the error signal Sea outputted from the error amplifier 140 by the gain signal Sg outputted from the piecewise linear gain circuit 130 and then multiply the resulting value by the magnitude of the rectified input voltage Vin to generate the control signal Scom. In implementations, the PFC controller 124 may adopt a voltage or a current Iac having a proportional relation with the input voltage Vin to represent the magnitude of the input voltage Vin. The PWM signal generator 122 generates corresponding PWM signal according to the control signal Scom to control the operations of the power switch 116, so as to make the input current Iin to change with the control signal Scom. Since the control signal Scom has the same wave form as the input voltage Vin, the afore-mentioned control method may make the waveform of the input current Iin to follow the waveform of the input voltage Vin, thereby improving the power factor.

Additionally, since the magnitude of the gain signal Sg outputted from the piecewise linear gain circuit 130 approximates to the square value of the magnitude of the feed forward signal Sff, it can avoid a feedback compensation signal of the AC-to-DC converter 100, i.e., the error signal Sea in this case, from changing with the magnitude of the input voltage Vin by utilizing the PWM controller 150 to divide the error signal Sea by the gain signal Sg outputted from the piecewise linear gain circuit 130.

In the afore-mentioned embodiment, the piecewise linear gain circuit 130 divides the range of the input feed forward signal Sff to two sections and respectively applies different gains to the two sections so as to make the magnitude of the resulting gain signal Sg to approximate to the square value of the magnitude of the feed forward signal Sff. This is merely an embodiment, rather than a restriction to the practical implementations. In implementations, the piecewise linear gain circuit 130 may utilize more comparing circuits, amplifiers, and switches to divide the range of the feed forward signal Sff to more sections and apply different linear gains to respective sections to make the relation between the gain signal Sg and the feed forward signal Sff to further approximate to a square relation.

In another embodiment, the piecewise linear gain circuit 130 may be realized with only one amplifier having an adjustable gain and only one current sink having an adjustable current sink amount. When the feed forward signal Sff is in different ranges, the amplifier may be configured to apply different gains and/or the current sink may be configured to sink different current amounts to generate a required gain signal Sg.

In another embodiment, the feed forward signal Sff generated by the low-pass filter 112 is a current signal. In this situation, the transconductance circuit 220 of the piecewise linear gain circuit 130 may be omitted.

In other embodiments, the piecewise linear gain circuit 130 may be realized with one or more transconductance circuits, one or more amplifiers, and/or one or more current sinks, so that the resulting gain signal Sg has different gains when the feed forward signal Sff in different ranges.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An active power factor correction (PFC) circuit for calibrating a power factor of an AC-to-DC converter comprising an inductor and a power switch when the active PFC circuit is coupled with the AC-to-DC converter, the active PFC circuit comprising:

a piecewise linear gain circuit for receiving a feed forward signal and generating a corresponding gain signal, wherein the gain signal and the feed forward signal have a broken line relation with respect to magnitude;

an error amplifier for generating an error signal according to an output voltage of the AC-to-DC converter;

a PWM controller for generating a control signal according to the gain signal and the error signal; and a PWM signal generator, coupled with the PWM controller, for generating a PWM signal for controlling the power switch of the AC-to-DC converter according to the control signal;

wherein if the feed forward signal is less than a predetermined threshold, the piecewise linear gain circuit applies a first gain to the feed forward signal to generate the gain signal, and if the feed forward signal is greater than the predetermined threshold, the piecewise linear gain circuit applies a second gain to the feed forward signal to generate the gain signal.

2. The active PFC circuit of claim 1, wherein the PWM controller is for generating the control signal according to the gain signal, the error signal, and an input voltage of the AC-to-DC converter.

3. The active PFC circuit of claim 2, wherein the control signal is directly proportional to a magnitude of the error signal and a magnitude of the input voltage, and is inversely proportional to a magnitude of the gain signal.

4. The active PFC circuit of claim 3, wherein the feed forward signal is generated by a low-pass filter of the AC-to-DC converter according to the input voltage.

5. The active PFC circuit of claim 1, wherein the second gain is greater than the first gain.

6. A PFC controller for controlling a PWM signal generator of an active PFC (power factor correction) circuit when the PFC circuit is coupled with an AC-to-DC converter, the PFC controller comprising:

a piecewise linear gain circuit for receiving a feed forward signal, wherein if the feed forward signal is less than a predetermined threshold, the piecewise linear gain circuit applies a first gain to the feed forward signal to generate a gain signal, and if the feed forward signal is greater than the predetermined threshold, the piecewise linear gain circuit applies a second gain to the feed forward signal to generate the gain signal;

an error amplifier for generating an error signal according to an output voltage of the AC-to-DC converter; and a PWM controller for generating a control signal according to the gain signal and the error signal to control the PWM signal generator;

wherein the second gain is greater than the first gain.

7. The PFC controller of claim 6, wherein the piecewise linear gain circuit comprises:

an amplifying module for generating a current directly proportional to a voltage of the feed forward signal;

a current adjusting module, coupled with an output terminal of the amplifying module, for sinking current; and a comparing circuit, coupled with the amplifying module and the current adjusting module, for comparing the feed forward signal with the predetermined threshold and for adjusting a total current output of the amplifying module and a total current sink of the current adjusting module according to comparison results.

8. The PFC controller of claim 7, wherein the amplifying module comprises:

a first amplifier for generating a first current directly proportional to the voltage of the feed forward signal;

a second amplifier for generating a second current directly proportional to the voltage of the feed forward signal; and a first switch, coupled between an output terminal of the second amplifier and the current adjusting module, for coupling the second current to an input terminal of the current adjusting module when the first switch is turned on;

wherein when the feed forward signal is less than the predetermined threshold, the comparing circuit turns off the first switch, and when the feed forward signal is greater than the predetermined threshold, the comparing circuit turns on the first switch.

9. The PFC controller of claim 8, wherein the current adjusting module comprises:

a first current sink, coupled with an output terminal of the first amplifier, for sinking a first predetermined amount of current;

a second current sink for sinking a second predetermined amount of current; and a second switch, coupled between the output terminal of the first amplifier and the second current sink, for coupling the first current to an input terminal of the second current sink when the second switch is turned on;

wherein when the feed forward signal is less than the predetermined threshold, the comparing circuit turns off the second switch, and when the feed forward signal is greater than the predetermined threshold, the comparing circuit turns on the second switch.

10. The PFC controller of claim 9, wherein the first switch couples the second current to an input terminal of the first current sink when the first switch is turned on.

11. The PFC controller of claim 9, wherein the second predetermined amount of current is greater than the first predetermined amount of current.

12. The PFC controller of claim 11, wherein the voltage of the feed forward signal ranges from 0.8~2.5V, the gain of the first amplifier is 1.1, the gain of the second amplifier is 1.1, the predetermined threshold is 1.65V, and the second predetermined amount of current is three times of the first predetermined amount of current.

13. The PFC controller of claim 7, wherein the piecewise linear gain circuit further comprises:

a transconductance circuit, coupled with an input terminal of the amplifying module, for converting the feed forward signal into a current signal to generate a feed forward current directly proportional to the voltage of the feed forward signal.

14. The PFC controller of claim 13, wherein the total current output of the amplifying module when the feed forward signal is greater than the predetermined threshold is twice of that when the feed forward signal is less than the predetermined threshold, and the total current sink of the current adjusting module when the feed forward signal is greater than the predetermined threshold is three times of that when the feed forward signal is less than the predetermined threshold.

15. The PFC controller of claim 6, wherein the PWM controller is for generating the control signal according to the gain signal, the error signal, and an input voltage of the AC-to-DC converter.

* * * * *